United States Patent Office

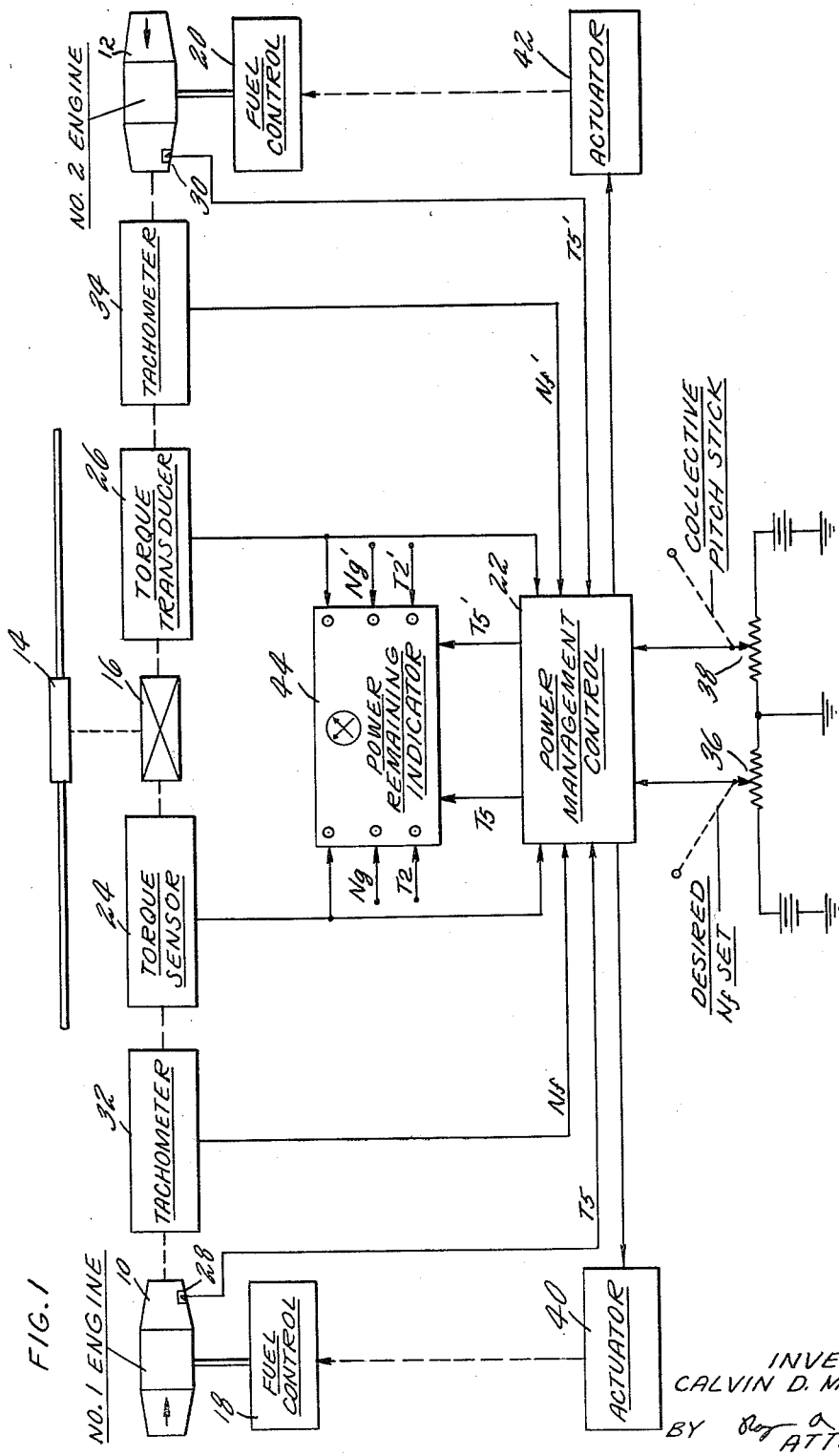

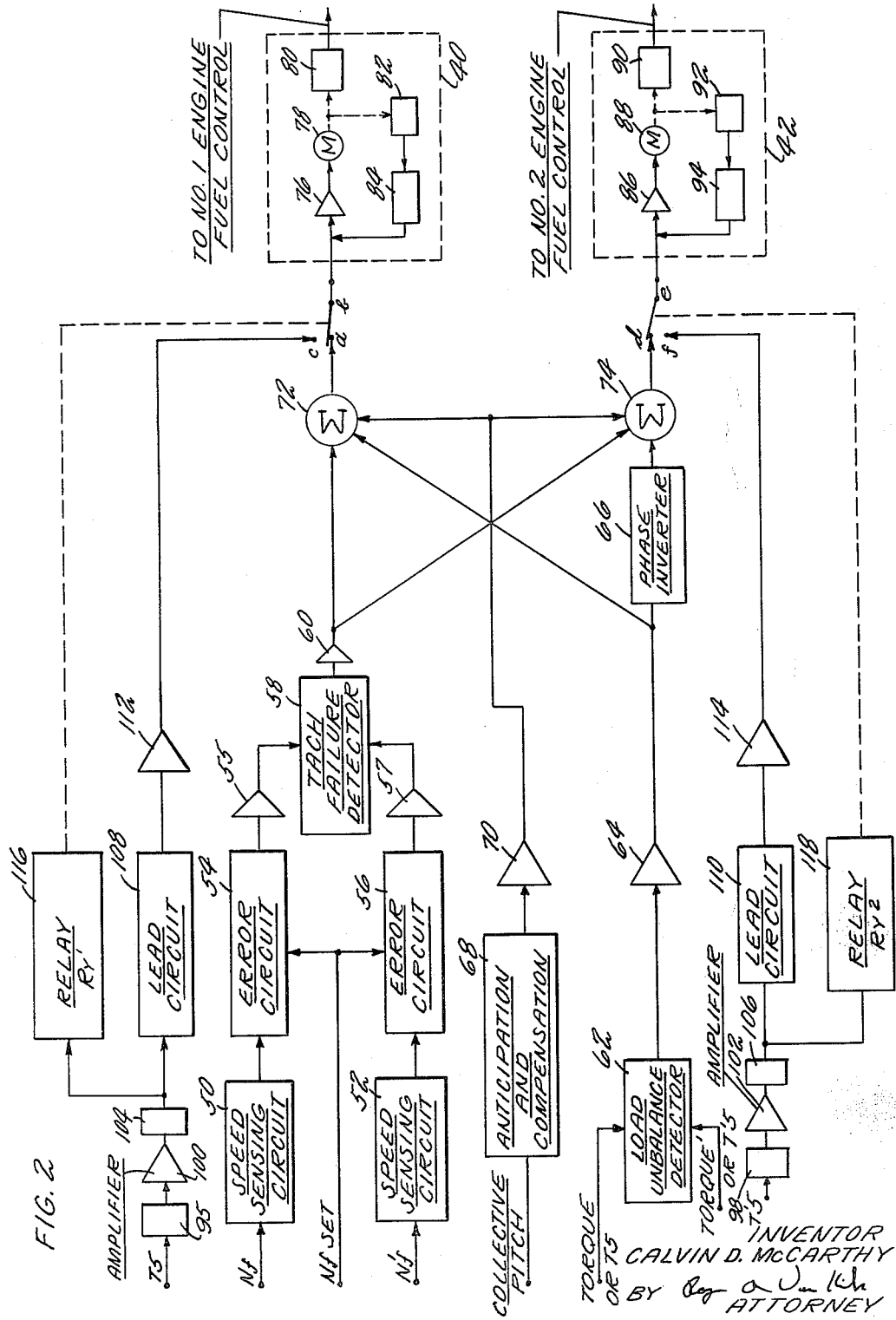

3,174,284
Patented Mar. 23, 1965

3,174,284
POWER MANAGEMENT FUEL CONTROL FOR PLURAL GAS TURBINE ENGINES
Calvin D. McCarthy, Manchester, Conn., assignor to United Aircraft Corporation, East Hartford, Conn., a corporation of Delaware
Filed Feb. 19, 1963, Ser. No. 259,591
20 Claims. (Cl. 60—39.16)

This invention relates to a power management control for use on a craft employing a gas turbine engine. More particularly, this invention is directed to apparatus which, when used in association with the fuel control on a gas turbine engine, will provide isochronous governing of the engine and, when used on a multi-engine craft, will also provide load sharing between the engines.

While not limited thereto, this invention is thought to have particular utility when employed on a helicopter utilizing a pair of free turbine engines to drive a single main rotor. As is well known, a free turbine engine consists of a gas generator driving a free turbine which is, through appropriate gearing, connected to a load. In the case of a twin turbine installation, considerable inconvenience has been experienced by pilots in maintaining an equal load on the engines. Apparatus that will provide for load sharing is necessary since it is desired to subject the engine to equal wear at the point of going to overhaul so as not to have one wear out short of its rated time between overhauls. Accompanying the foregoing inconvenience, in the prior art, has been a problem known as "engine droop." In a helipocter the latter problem reveals itself as a loss in rotor speed when the load on the engines is increased as by increasing the collective pitch of the rotor blades. Further, there is a transient undershoot of free turbine speed with the sudden application of collective pitch. This latter transient droop, although eventually compensated for by the hydromechanical fuel control on the engines, often results in unnecessary corrective action being taken by the pilot since he has no way of knowing whether the droop was caused by overloading or engine failure rather than the transient droop.

This invention overcomes the above stated problems by providing a novel power management control for either a single or plurality of gas generators.

It is therefore an object of this invention to provide isochronous governing of a gas generator.

It is another object of this invention to provide isochronous governing of a plurality of gas generators.

It is yet another object of this invention to provide for load sharing between a plurality of gas generators.

It is also an object of this invention to provide both isochronous governing of and load sharing between a plurality of gas generators.

It is another object of this invention to anticipate and compensate for transient changes in the selected load on a gas generator.

It is a further object of this invention to anticipate and compensate for transient changes in the selected load on a plurality of gas generators.

It is still another object of this invention to provide over-temperature protection for one or more gas generators.

It is another object of this invention to reduce the amount of pilot attention required for engine control on a single or multi-engine craft employing gas turbine engines.

It is also an object of this invention to provide reliable automatic control of fuel flow to one or more gas generators.

These and other objects of this invention are accomplished by sensing the speed of the means driven by a gas generator. The sensed speed is then compared with the desired speed of the driven means to produce a speed error signal. Also sensed and combined with the above-mentioned speed error signal is a signal indicating a desired change in the selected load on the gas generator. Addition of this latter signal permits the gas generator to anticipate changes in the load. The combined speed error and load change anticipation signals provide a control signal for an actuating means on the fuel control of the gas generator. Thus, the control signal operates through appropriate means to adjust the fuel flow to the gas generator thereby providing isochronous governing. In a multi-engine installation, the power output of each of the gas generators is also sensed. Through comparison of these power outputs or the loads on the gas generators, load unbalance signals are produced. These load unbalance signals are combined with the above-mentioned control signal to provide individual control signals for the fuel control actuation means on each engine. Thus, the power management control of this invention will maintain a balanced load condition along with the above-mentioned isochronous governing.

This invention may be better understood and its numerous advantages will become apparent to those skilled in the art by reference to the accompanying drawing wherein like reference numerals apply to like elements in the various figures and in which:

FIGURE 1 is a block diagram depicting the use of the power management control which comprises this invention on a twin turbine helicopter.

FIGURE 2 is a block diagram of the power management control which comprises this invention.

Referring now to FIGURE 1, typical utility of the power management control is shown. In this figure, the environment of the control is a twin turbine helicopter which employs a pair of free turbine engines, 10 and 12, to drive a main rotor 14 and a tail rotor, not shown, through appropriate gearing 16 which may be of the type shown in FIGURE 4 of U.S. Patent No. 2,984,306 issued to E. Kottsieper on May 16, 1961. Engines 10 and 12 are respectively equipped with fuel controls 18 and 20 which are connected to a source of fuel, not shown. Fuel controls 18 and 20 may be of the type disclosed in U.S. Patent No. 2,857,741, issued to J. D. Evers, on October 28, 1958 and assigned to the same assignee as this invention. For operation of the power management control, shown in block form at 22, means are provided on each of engines 10 and 12 for sensing engine operating parameters. In order to perform the load sharing function, means are provided on each engine to sense its power output. Since an actual measurement of engine power is not needed, only a comparison being made between the power outputs of the two engines for balancing purposes, considerable flexibility is permitted in the choice of the parameter to be sensed to give an indication of power output. The embodiment of FIGURE 1 shows a pair of torque sensors 24 and 26 respectively connected to the shafts of the free turbines of engine 10 and 12. These torque sensors may be any commercially available type which will produce an electrical output signal proportional to torque. If, because of the particular installation, it is undesirable to employ torque sensors, the gas generator discharge temperatures, T5 and T5′, respectively from engines 10 and 12, may be used to compute the load unbalance. For this purpose, a pair of gas generator discharge temperature sensors 28 and 30, which may be thermocouples, are respectively depicted as mounted on the interiors of engines 10 and 12. The torque or T5 signals from the sensors on each engine are compared in the power management control to provide a signal indicative of the load unbalance. This load unbalance signal, through means which will be described below, causes a reduction in the fuel flow to the engine having more than its share of the load and an increase in fuel flow to the other engine to cause it to pick up more load.

While capable of being used to provide indication of engine power output, the T5 input signals to power management control 22 serve the further function of providing temperature information for the T5 limiting section of the control. Should T5, which is the free turbine inlet temperature, increase beyond a limiting value, the power management control will automatically order a fuel flow reduction for the engine having the over-temperature condition.

To provide for isochronous governing, it is necessary to sense the speed of the means driven by the engines. While this might be done by sensing the speed of rotor 14, it has been found more desirable to sense the speed, $Nf$, of the free turbine which is driving the rotor. This speed is, of course, directly related to rotor speed. To accomplish $Nf$ sensing there is provided a pair of free turbine tachometers 32 and 34 which are respectively connected to the free turbine shafts of engines 10 and 12. The use of two tachometers, while not necessary for operation, provides a safety feature. That is, the two tachometers are tied in redundancy through a selection circuit such that in the case of a tachometer or engine failure there will still be an $Nf$ input signal to the power management control. In control 22, the sensed value of $Nf$ is compared with the desired free turbine speed, which has been selected by the pilot by positioning the wiper arm of an $Nf$ potentiometer 36 which is mechanically connected to his free turbine speed selector. The difference in these two speed signals or the $Nf$ error signal, like the load sharing signal, is then used to adjust, through appropriate means, the fuel flow to the engines and thereby increase or decrease the speed of the gas generators in accordance with the $Nf$ error.

As is well known, when the pilot of a helicopter wishes to change engine power, he changes the pitch of the main rotor blades. This is accomplished by manipulating a collective pitch stick located in the cockpit. Obviously, a change in the pitch of the rotor blades will change the load on the engines. When such a change in the selected load is requested, there is a short time delay before the hydromechanical blade control system can react to change the pitch of the rotor blades. In the prior art, once the pitch of the blades had changed thereby changing the load on the engines and consequently changing engine speed, there was a further short time delay due to the drag and mass of the gas generators before the hydromechanical fuel controls, such as 18 and 20, could accelerate the gas generators to cause them to bring the free turbines back to the selected speed. The power management control of this invention eliminates the latter transient droop or increase in speed by anticipating a change in the selected load on the engines and commanding a fuel flow correction in the right direction to compensate for the coming change in load. For this purpose, a collective pitch bias signal is obtained from an air frame installed transducer which may be an inductive type rotary transducer or, as shown in FIGURE 1, a potentiometer 38 the wiper arm of which is positioned by movements of the collective pitch stick to produce a signal proportional to collective stick motions. The signal generated by potentiometer 38 is applied to power management control 22 which utilizes this signal to generate a fuel flow correction command which is applied to the fuel flow adjusting means before the hydromechanical blade control system can react to change the load on the engines.

In order to provide the fuel flow corrections mentioned above, the output signals generated by power management control 22 are applied to actuators 40 and 42 which are respectively connected through appropriate mechanical means to fuel controls 18 and 20. Actuators 40 and 42 convert the electrical output signal from control 22 into mechanical shaft or linkage movements. The mechanical output signals from the actuators may be utilized to reposition the $Nf$ setting of the fuel controls. This might be accomplished by causing rotation of cam 160 of FIGURE 2 of the fuel control shown in the above-mentioned Evers patent. Alternatively, the outputs of actuators 40 and 42 may be utilized, through appropriate means, to change the compressor discharge pressure, P3, signal to the P3 sensing bellows on each of hydromechanical fuel controls 18 and 20. Since fuel controls 18 and 20 are responsive to compressor discharge pressure, the output of the actuators will, in effect, be changing fuel flow. As is well known in the art, the P3 signal may be varied by means of controlling a bleed valve in the P3 sensor feed line.

As shown in FIGURE 1, it is most desirable to use the power management control of this invention with a power remaining indicator 44. Indicator 44 computes and displays the power remaining in each engine and thereby gives the pilot a visual presentation of the conditions being managed by the control of this invention. A power remaining indicator of this type is disclosed in copending application No. 255,815, filed February 4, 1963, by C. Brahm et al., entitled Power Remaining Indicator and assigned to the assignee as this invention.

Referring now to FIGURE 2, there is shown a block diagram of power management control 22. The free turbine speed signals, $Nf$ and $Nf'$, from tachometers 32 and 34 are respectively applied to speed sensing circuits 50 and 52. Circuits 50 and 52 sense a change in tachometer frequency and put out a D.C. voltage proportional to frequency which, in turn, is proportional to speed. A circuit with these characteristics is disclosed in copending application 54,073 filed September 6, 1960, by H. E. Martin entitled Speed Responsive Control System now U.S. Patent No. 3,119,055, issued January 21, 1964, and assigned to the same assignee as the present invention. The output signals from speed circuits 50 and 52 are respectively applied to a pair of error circuits 54 and 56 which may be comparison circuits of a type well known in the art. Also applied to error circuits 54 and 56 is the $Nf$ set signal from potentiometer 36 indicative of the desired free turbine speed. The $Nf$ set signal is compared with the actual free turbine speed signals in error circuits 54 and 56 to produce difference voltages indicative of the speed error. The difference voltages from error circuits 54 and 56 are respectively applied to amplifiers 55 and 57. The gain of amplifier 57 is adjusted to be approximately .8 that of amplifier 55. The amplified speed error signals from amplifiers 55 and 57 are applied to a tachometer failure detector 58. Failure detector 58 comprises a voltage magnitude sensitive diode selection circuit which may be of the type disclosed in copending application No. 256,085, filed February 4, 1963, by H. E. Martin entitled Most Gate and assigned to the same assignee as this invention. The outputs of amplifiers 55 and 57 are compared in the selector circuit. Normally, because of its reduced gain, the speed error signal from amplifier 57 corresponding to the $Nf$ of number 2 engine 12 will be blocked at the selector circuit and the output of amplifier 55 corresponding to the number 1 engine $Nf$ error, will be passed. In the event of failure of number 1 engine's tachometer 32, the number 2 engine speed error voltage will be switched in and speed control will be maintained at the reference setting with a reduced gain in the speed control circuit of the power management control.

In the event of a rapid loss of number 1 engine 10, the system would react in the same manner as a loss in the tachometer signal of number 1 engine. If number 1 engine's speed declines slowly, the number 1 engine speed error signal remains in control until the speed has declined to 80% of the $Nf$ reference setting. At this point, the number 2 engine speed error voltage will exceed that of number 1 engine and accordingly will be switched in and bring the number 2 engine 12 back on the speed control. During the period of time that the speed of number 1 engine has declined to 80% of the selected speed, the number 2 engine has been driven to the temperature or speed limit because of the under speed signal generated by the loss of number 1 engine. As a result of the operation of failure detector 58, the good engine reacts to pick up as much of the load as it is capable of absorbing.

The selected speed error signal from tachometer failure detector 58 is applied to a standard low level chopper and push-pull connected A.C. amplifier 60. The speed error signal is modulated by an A.C. signal in chopper-amplifier 60 and the resultant A.C. signal is then amplified. While not mandatory, use of A.C. amplifiers is desirable for reasons of stability. That is, A.C. amplifiers are not subject to the gain fluctuations usually inherent in D.C. amplifiers due to drift.

The power output signals from the power output sensors associated with number 1 engine 10 are applied to a load unbalance detector 62. Referring to FIGURE 1, the input signal to detector 62 indicative of the power output of number 1 engine 10 may be either the torque signal from torque sensor 24 or the T5 signal from thermocouple 28. Also applied to load unbalance detector 62 is a signal indicative of the power output of number 2 engine 12. This signal may be either of the torque signal from torque sensor 26 or the T5' signal from the thermocouple 30. Detector 62, which may be any well known type of comparison circuit, compares the torque or T5 signals indicative of the power output of the two engines and provides an error signal the magnitude and polarity of which indicates a load unbalance. The load unbalance signal from detector 62 is amplified by amplifier 64 which, like amplifier 60, is preferably a well-known type of chopper-amplifier which converts the D.C. output from detector 62 to an A.C. signal which varies about a D.C. level established by the output from detector 62. Since the load unbalance signal from amplifier 64 is used for balancing purposes, it must be modified so as to cause fuel flow correction in opposite directions on engines 10 and 12. For this purpose, the output from amplifier 64 is split and one of the two resultant signals is given opposite phasing by a phase inverter 66 so that the control signals ultimately applied to actuators 40 and 42 will cause the fuel flow to one of the engines to increase and the other to decrease in order to balance load.

The collective pitch bias signal from collective stick movement responsive potentiometer 38 is applied to an anticipation and compensation circuit 68. The function of circuit 68, which is a derivative circuit followed by an R.C. lead network, is to provide an output signal only when the collective stick is being moved and to impart a lead to this signal. The output signal from circuit 68 is then modulated and amplified by a chopper-amplifier 70 to provide an A.C. signal proportional to changes in collective stick position. The latter signal, when applied to actuators 40 and 42, will, in the case of an increase in collective pitch, cause a temporary rapid increase in fuel flow. This increase in fuel flow will occur before the mechanical blade pitch control system can react. Thus, at the time the load begins to increase, the power management control has already ordered, by means of increased fuel flow, an increase in gas generator speed and accordingly an increase in power available to the free turbines sufficient to offset the decrease in Nf which would be caused by the increased load. Thus, the transient droop is eliminated by this invention. Any steady state droop which would tend to be caused by the new load on the engines, after the collective pitch bias signal decays, will be compensated for by the Nf error signal.

A speed error signal from amplifier 60 and a collective pitch anticipation signal from amplifier 70 are applied to each of a pair of summing circuits 72 and 74. Also applied to summing circuit 72 is the load unbalance signal from amplifier 64. The inverted load unbalanced signal from phase inverter 66 is applied to summing circuit 74. Summing circuits 72 and 74 may each be comprised of three transformers. Each of the three input signals to each of the summing circuits will be connected across the primary winding of one of these transformers. The secondary windings of the three transformers in each circuit will be connected in series thereby providing the summing. The output signal from summing circuit 72 is amplified by amplifier 76 of actuator circuit 40 to a level capable of driving a motor 78 which in turn powers an actuator 80 which may be a rotary actuator. The mechanical output signal from actuator 80 is utilized, in the manner mentioned above, to cause fuel control 18 to adjust fuel flow to number 1 engine 10 in the desired direction. In order to insure zero steady-state error, each of the actuator circuits comprises a stabilized integrating loop. That is, the mechanical output from motor 78 is, due to the time lag in accelerating the motor to full speed, the integral of the input signal to amplifier 76. For purposes of stabilization, there is provided a tachometer 82 which senses the shaft speed of motor 78. The output of tachometer 82 is filtered by a filter 84 to remove noise which would ordinarily be present even when motor 78 is not operating. The filtered tachometer signal is applied to the input of amplifier 76. This small feedback makes the loop insensitive to gain changes in the amplifier 76. The output from summing circuit 74 is amplified by amplifier 86 to a level capable of driving motor 88 which in turn powers actuator 90. The mechanical output from actuator 90, through appropriate means, controls the fuel flow to the number 2 engine 12. By use of tachometer 92 and filter 94, actuator circuit 42 also functions as a stabilized integrating loop.

Temperature limiting is accomplished by comparing a signal proportional to the T5 temperature from the engine mounted thermocouples 28 and 30 with a signal proportional to the limiting value of T5. The T5 signal from number 1 engine 10 is applied to a comparator circuit 95 while the T5' signal from number 2 engine 12 is applied to a comparator circuit 98. Comparator circuits 95 and 98 each comprise means for establishing a reference voltage level corresponding to the limiting value of T5. This reference voltage level may be derived, in a manner well-known in the art, from a precision Zener diode. When the actual value of T5 for either engine exceeds the reference level as established by the Zener diode, an over-temperature signal will appear at the output of the comparator circuit associated with the engine having the over-temperature condition. The magnitude of this over-temperature voltage is determined by the difference between the T5 reference level and the output of the engine thermocouple. The over-temperature signals from comparators 95 and 98 are low level signals and thus are respectively applied to chopper-amplifiers 100 and 102 which convert them into relatively high level A.C. signals. It is desirable to convert the D.C. over-temperature signals from comparators 95 and 98 into A.C. signals for amplification purposes since the use of A.C. amplifiers enables high gain while providing the good stability not obtainable with D.C. amplification. The amplified over-temperature signals from chopper-amplifiers 100 and 102 are next demodulated by demodulators 104 and 106 to provide high level D.C. signals for lead circuits 108 and 110 respectively. Lead circuits 108 and 110 may be R.C. networks which are designed to compensate for the inherent thermocouple lag thereby yielding fast response over-temperature signals. The output signals from lead circuits 108 and 110 are respectively applied to chopper-amplifiers 112 and 114 which convert these signals back into A.C. signals of the proper magnitude. The high level D.C. signals from demodulators 104 and 106 are also applied to relay circuits 116 and 118. For the purposes of this explanation, relay circuits 116 and 118 are described as being merely relay coils. However, it should be noted that, for faster circuit response and longer trouble free operation, relay circuits 116 and 118 may be electronic switching networks of an existing variety that are entirely solid state. An over-temperature input signal to either of circuits 116 and 118 results in current flow through the relay coil of respective relays Ry1 and Ry2. Current flow through the coil of relay Ry1 will cause opening of normally closed contacts $a$ and $b$ of that relay while current flow through the coil of relay Ry2 will cause opening of normally closed contacts $d$ and $e$ of that relay. As can be seen from FIGURE 2, opening of normally closed contacts $a$ and $b$ of relay Ry1 breaks the circuit between summing network 72 and actuator 40 and, at the same time, establishes a path for the over-temperature signal from chopper-amplifier 112 to actuator 40 via contacts $c$ and $b$ of the relay. Similarly, opening of contacts $d$ and $e$ of relay Ry2 breaks the circuit between summing network 74 and actuator 42 and establishes a path for the number 2 engine over-temperature signal from chopper-amplifier 114 to actuator 42 via relay contacts $e$ and $f$. Thus, when the limiting value of T5 for either engine is exceeded, the relay in the channel for that engine transfers control of the actuators from the speed error, collective pitch and load sharing authority on to temperature control, thus maintaining a limit on gas generator discharge temperatures. As should be obvious, the output signals from chopper-amplifiers 112 and 114 are such that, when applied to actuators 40 and 42, they will cause a reduction in fuel flow to the gas generators and thereby cause a reduction in T5.

While a preferred embodiment of this invention has been shown and described, various modifications and substitutions may be made without deviating from the spirit and scope of this invention. It is to be particularly noted that, while shown as a single unit, this invention may be constructed with only slight modification to be two independent units; one for each engine. In the latter case, there obviously must be provision for cross-feed of load information signals between the engines. Thus, this invention is described by way of illustration rather than limitation and accordingly it is understood that this invention is to be limited only by the appended claims taken in view of the prior art.

I claim:
1. A power management control for a plurality of gas generators each of which has a fuel control for regulating the flow of fuel thereto comprising:
   means for generating a signal commensurate with the power output of each of the gas generators,
   means for comparing the power output signals for producing error signals indicative of the load unbalance between the gas generators,
   means for generating a signal commensurate with the speed of the means driven by the gas generators,
   means for producing a signal indicative of the desired speed of the driven means,
   means for comparing said signal commensurate with speed with said desired speed signal to provide a speed error signal,
   signal combining means responsive to said speed error and load unbalance signals for producing a plurality of control signals, and
   means respectively responsive to individual ones of said control signals for adjusting respective ones of the fuel controls wherein each fuel control is adjusted and speed governing of and load sharing between the gas generators is effected.
2. The apparatus of claim 1 wherein the means for producing a plurality of control signals comprises:
   means responsive to said speed error signal and one of said load unbalance error signals for producing a first control signal, and
   means responsive to said speed error signal and a second one of said load unbalance error signals for producing a second control signal.
3. The apparatus of claim 2 further comprising:
   means for sensing the temperature of the discharge from each of the gas generators,
   means for providing signals indicative of the limiting value of the discharge temperature,
   means for comparing the outputs from said temperature sensing means and said means for providing a limiting temperature signal to produce an over-temperature signal whenever a sensed temperature exceeds the limiting temperature, and
   means responsive to said over-temperature signal for removing the control signal from the fuel control adjusting means associated with the gas generator experiencing the over-temperature condition.
4. The apparatus of claim 3 further comprising:
   means responsive to said control signal removing means for applying the over-temperature signal to said fuel control adjusting means upon removal of the control signal therefrom.
5. The apparatus of claim 2 further comprising:
   means responsive to a change in the selected load on the driven means for producing a load change anticipation signal, and
   means for applying said load change anticipation signal to each of said control signal producing means to cause variation in each of the control signals in anticipation of a change in the load on the gas generators.
6. The apparatus of claim 5 further comprising:
   means for sensing the temperature of the discharge from each of the gas generators,
   means for providing signals indicative of the limiting value of the discharge temperature,
   means for comparing the outputs from said temperature sensing means and said means for providing a limiting temperature signal to produce an over-temperature signal whenever a sensed temperature exceeds the limiting temperature, and
   means responsive to said over-temperature signal for removing the control signal from the fuel control adjusting means associated with the gas generator experiencing the over-temperature condition.
7. The apparatus of claim 6 further comprising:
   means responsive to said control signal removing means for applying the over-temperature signal to said fuel control adjusting means upon removal of the control signal therefrom.
8. The apparatus of claim 7 wherein the means for generating power output signals comprises:
   means for sensing the torque developed by the means driven by each of the gas generators.
9. The apparatus of claim 8 wherein the means for producing load unbalance error signals comprises:
   means for comparing the outputs of said torque sensing means to provide a difference signal commensurate with load unbalance, and
   means responsive to the output of said comparing means for converting said difference signal commensurate with load unbalance into a pair of mutually opposite load unbalance signals, and means for applying said mutually opposite load unbalance signals to respective control signal producing means.
10. The apparatus of claim 7 wherein the means for generating power output signals comprises:
    means for sensing the temperature of the discharge from each of the gas generators.
11. The apparatus of claim 10 wherein the means for producing load unbalance error signals comprises:
    means for comparing the outputs of said temperature sensing means to provide a difference signal commensurate with load unbalance, and means responsive to the output of said comparing means for converting said difference signal commensurate with load unbalance into a pair of mutually opposite load unbalance signals, and means for applying said mutually opposite load unbalance signals to respective control signal producing means.

12. A power management control for a plurality of gas generators which provide power for driving a common load, each of said generators having a fuel control for regulating the flow of fuel thereto, comprising:

means for generating a signal commensurate with the power output of each of the gas generators, means for comparing said power output signals to provide a difference signal commensurate with load unbalance, means responsive to said difference signal for generating first and second mutually opposite load unbalance signals, means for generating a signal commensurate with the speed of the means driven by the gas generators, means for generating a reference signal indicative of the desired speed of the driven means, means for comparing said signal commensurate with actual speed with said desired speed signal to produce a speed error signal, means responsive to said speed error signal and the first of said load unbalance signals for producing a first control signal, means responsive to said speed error signal and the second of said load unbalance signals for producing a second control signal, and means respectively responsive to said first and second control signals for adjusting respective ones of the fuel controls on the gas generators.

13. The apparatus of claim 12 further comprising:

means responsive to a change in the selected load on the driven means for producing a load change anticipation signal, and means for applying said load change anticipation signal to each of said control signal producing means to cause variation in each of the control signals in anticipation of a change in the load on the gas generators.

14. The apparatus of claim 13 further comprising:

means for sensing the temperature of the discharge from each of the gas generators, means for providing signals indicative of the limiting value of the discharge temperature, means for comparing the outputs from said temperature sensing means and said means for providing a limiting temperature signal to produce an over-temperature signal whenever a sensed temperature exceeds the limiting temperature, and means responsive to said over-temperature signal for removing the control signal from the fuel control adjusting means associated with the gas generator experiencing the over-temperature condition.

15. The apparatus of claim 14 further comprising:

means responsive to said control signal removing means for applying the over-temperature signal to said fuel control adjusting means upon removal of the control signal therefrom.

16. The apparatus of claim 15 wherein the means for generating a signal commensurate with the speed of the means driven by the gas generators comprise:

a plurality of tachometers each connected to the means driven by a gas generator for generating signals commensurate with the actual speed of each of the driven means.

17. The apparatus of claim 16 wherein the means for producing a speed error signal comprises:

means for comparing the signal indicative of desired speed with the actual speed signal from a first one of said tachometers to produce a first speed error signal, means for comparing the signal indicative of desired speed with the actual speed signal from a second one of said tachometers to produce a second speed error signal, means for modifying the relative magnitudes of said speed error signals in order to have the magnitude of one of said signals exceed the other under normal operating conditions, and, means responsive to the modified speed error signals for selecting the signal having the greatest magnitude for passage to the control signal producing means whereby a speed error signal will be applied to the control signal producing means under conditions of a tachometer or gas generator failure.

18. A power management control for a plurality of engines mounted so as to coact, each engine being of the gas generator free turbine type, one of said engines having a fuel control and being utilized with at least a second such free turbine engine to provide power, comprising:

tachometer means for sensing the speed of the free turbine of the first of said engines and for generating a signal commensurate therewith, means for producing a signal indicative of the desired speed of the free turbine of the first engine, means for comparing said signal commensurate with speed with said desired speed signal to provide a speed error signal, means for sensing a quantity indicative of the power output of the gas generator of the first engine and for generating a first signal commensurate therewith, means for sensing a quantity indicative of the power output of the gas generator of the second engine and for generating a second signal commensurate therewith, means for comparing said first and second power output signals for producing a load unbalance signal, means responsive to said speed error and load unbalance signals for producing a control signal, and fuel control operating means responsive to said control signal and operatively connected to the fuel control on the first engine for causing adjustment of the fuel flow to the first engine.

19. The apparatus of claim 18 further comprising:

means responsive to the selection of a change in the torque to be developed by the first engine for producing a load change anticipation signal, and means for applying said load change anticipation signal to said control signal producing means to cause variation in the control signal in anticipation of a change in the torque developed by the first engine.

20. The apparatus of claim 19 further comprising:

means for sensing the temperature of the discharge from the first engine, means for generating a signal indicative of the limiting value of the discharge temperature, means for comparing the outputs from said temperature sensing means and said means for providing a limiting signal to produce an over-temperature signal whenever a sensed temperature exceeds the limiting temperature, and means responsive to said over-temperature signal for removing the control signal from the fuel control adjusting means and for applying said over-temperature signal thereto.

References Cited by the Examiner
UNITED STATES PATENTS 2,545,458   3/51   Ginn  ---------------- 60—97 X
2,612,956   10/52   Banning  ------------ 60—97 X (Other references on following page)

UNITED STATES PATENTS

| | | | |
|---|---|---|---|
| 2,768,504 | 10/56 | Werte et al. | 60—39.15 |
| 2,829,722 | 4/58 | Best | 170—135.74 |
| 2,851,113 | 9/58 | Irwin et al. | 170—135.72 |
| 2,941,601 | 6/60 | Best | 170—135.74 |
| 2,960,167 | 11/60 | Amelio | 170—135.74 |
| 2,985,243 | 5/61 | Tyler | 170—135.72 |
| 3,049,880 | 8/62 | Bracey et al. | 60—39.15 |
| 3,063,243 | 11/62 | Bancroft | 60—39.28 |

FOREIGN PATENTS

| | | |
|---|---|---|
| 474,555 | 6/51 | Canada. |

SAMUEL LEVINE, *Primary Examiner.*

JULIUS E. WEST, *Examiner.*